(12) United States Patent  (10) Patent No.: US 8,752,691 B2
Cristoforetti  (45) Date of Patent: Jun. 17, 2014

(54) SWITCHER (75) Inventor: Giorgio Cristoforetti, Varese (IT)

(73) Assignee: Mechanica Holding & Services S.p.A., Milan (IT)

( * ) Notice: Subject to any disclaimer, the term of this patent is extended or adjusted under 35 U.S.C. 154(b) by 348 days.

(21) Appl. No.: 13/207,403

(22) Filed: Aug. 10, 2011

(65) Prior Publication Data
US 2012/0037477 A1  Feb. 16, 2012

(30) Foreign Application Priority Data

Aug. 11, 2010 (IT) .............................. MI2010A1535

(51) Int. Cl.
B65G 47/52 (2006.01)

(52) U.S. Cl.
USPC .................. 198/369.2; 198/589; 198/592

(58) Field of Classification Search
USPC .................. 198/369.2, 435, 436, 589, 592
See application file for complete search history.

(56) References Cited

U.S. PATENT DOCUMENTS

| | | | | |
|---|---|---|---|---|
| 4,284,187 A | * | 8/1981 | Kramer et al. ................. | 198/435 |
| 5,692,593 A | * | 12/1997 | Ueno et al. ................. | 198/369.2 |
| 5,909,796 A | | 6/1999 | Soldavini | |
| 6,575,288 B2 | * | 6/2003 | Bartels et al. ................. | 198/438 |
| 6,619,464 B2 | * | 9/2003 | Peppel et al. ............... | 198/369.2 |
| 6,702,095 B2 | * | 3/2004 | Van Heeswijk et al. ... | 198/369.2 |
| 6,708,813 B2 | * | 3/2004 | Takahashi ................... | 198/369.2 |
| 7,080,541 B2 | * | 7/2006 | Xiong ......................... | 72/405.02 |
| 7,185,754 B2 | * | 3/2007 | Taylor et al. ............. | 198/750.14 |
| 7,472,785 B2 | * | 1/2009 | Albright et al. ............... | 198/589 |
| 7,837,426 B2 | * | 11/2010 | Lesko ......................... | 414/746.4 |

FOREIGN PATENT DOCUMENTS

JP    2006321589 A    11/2006

* cited by examiner

Primary Examiner — Douglas Hess
(74) Attorney, Agent, or Firm — Novak Druce Connolly Bove + Quigg LLP (57) ABSTRACT A vertical switcher includes a first conveyor belt mobile in rotation about a first tilting axis and a second conveyor belt mobile in rotation about a second tilting axis. A movement device moves the first and the second conveyor belt between an aligned condition in which the mobile ends thereof (opposite the inlet end and the outlet end) are substantially flanked and a switching condition in which the mobile ends are distanced from one another in order to enable passage of one or more objects crossing between them. The movement device exhibits a main oscillating arm that is mobile about a rotation axis coupled slidably to respective surfaces of the first and the second conveyor element such as to define a resting relation with the respective conveyor element.

30 Claims, 6 Drawing Sheets

SWITCHER

CROSS-REFERENCE TO RELATED APPLICATION

This application claims the benefit of priority of Italian Patent Application No. MI2010A001535, filed Aug. 11, 2010, pursuant to 35 U.S.C. 119(a)-(d), the disclosure of which is incorporated herein by reference.

TECHNICAL FIELD

The present disclosure relates to a switcher.

BACKGROUND

In particular, switchers, and in more detail vertical switchers, are tilting conveyor belt devices that are used in movement systems of objects such as sorter systems used for separating, according to a specific logic, objects in arrival from a first conveyor on one of the two superposed belts downstream of the first, conveyor systems such as merge systems (two lines into one), diverge (one line into two) or as flow balancing systems. Switchers are also used in airport systems with merge, diverge, sorting, bypass and flow-balancing, or also upstream of the sorters, as a kind of pre-sorting unit.

In particular, switchers are present on the market for automation of airport sectors, in distribution, in the postal sector and the parcel sector.

Document U.S. Pat. No. 5,909,796 illustrates a known type of vertical switcher at present widely used in the above-mentioned systems.

The above patent document describes an apparatus which comprises the presence of a conveyor belt that takes the objects from a coding station towards the switcher which in turn re-loads them on upper or lower conveyor planes according to needs.

A pair of loading conveyor belts are mounted on the support frame, as well as a third introducing conveyor. The lower loading conveyor belt is mounted fixed on the frame, while the upper loading belt tilts and can rotate about an axis in order to be brought from a position in which it is aligned with the introducing belt to one in which it is in a raised position.

The introducing conveyor belt is also maintained in tilting motion such as to be brought from a position in which it is aligned with the upper loading conveyor belt to a position in which it is aligned with the lower loading belt.

The above-mentioned oscillations are commanded by a motor which transmits an oscillating motion to an arm to which two con rods are terminally hinged, which con rods are respectively connected to the mobile ends of the two oscillating belts.

The length of the con rods is calculated in such a way as to obtain the required displacement for the conveyor belts with a rotation thereof that is limited such as to prevent them from reaching dead centre.

Although the above-described configuration, since its introduction onto the market, has led to various advantages with respect to known apparatus, in terms of machine velocity in particular, the loading device has been seen to be improvable in various ways.

Firstly, the structure of the known devices appears to be extremely unwieldy and expensive in terms of weight, logistic and installation costs.

In fact, the weights and dimensions in play involve various complexities in terms of transport and setting-up of the apparatus.

The known movement system of the tilting belts has also been seen to be affected by operative limitations and/or drawbacks.

An aim of the described embodiments is thus to disclose a switcher which can obviate one or more of the above-described drawbacks.

An objective of the described embodiments is to enable a lightening of the structure while substantially maintaining the same operative flexibility as the known devices.

An aim of the described embodiments is to reduce the weights and masses in play that are required for implementing the switching functionality of the apparatuses at present on the market.

An aim is to considerably improve the possibilities of movement and installation of the device, even in conditions and situations that were previously problematic (for example a plant already working and the need to replace the component; installation in environments affording contained spaces; etc.).

An aim is also to enable easier maintenance and control operations on the device.

An objective obtained by one or more of the described embodiments is to prevent damaging consequences to the device and/or to the transiting articles in a case in which an article is sheared (i.e. closing of the switcher during crossing of a product when the product is still interposed between the mobile belts).

Lastly, an aim of one or more of the described embodiments is to enable the device to assume different configurations of use (for example configurations with coplanar belts or in waterfall where the terminal part of the first of the two belts in the advancement direction is higher than the start point of the second) with simple and rapid interventions on the switcher.

One or more of the above aims is substantially attained by a switcher as disclosed herein.

SUMMARY

In a first aspect of the disclosure, a switcher comprises a support structure; a first conveyor element associated to the support structure and mobile in rotation at an inlet end thereof about a first tilting axis; a second conveyor element associated to the support structure and mobile in rotation at an outlet end thereof about a second tilting axis; and a movement device for moving the first and the second conveyor elements about the respective tilting axes thereof. The movement device configures the first and the second conveyor element between a condition of substantial alignment in which a mobile end of the first conveyor element opposite the inlet end and a mobile element of the second conveyor element opposite the outlet end are in reciprocal proximity and substantially flanked and a switching condition in which the mobile ends are distanced from one another in order to enable a passage of one or more objects which are crossing between the mobile ends. The movement device comprises a main oscillating arm which is mobile about a rotation axis. The movement device and in particular the main oscillating arm is slidably coupled both to the first and to the second conveyor element. A sliding coupling zone to the first conveyor element is arranged in an opposite position to a respective sliding coupling zone to the second conveyor element with respect to the rotation axis of the main oscillating arm.

In a further aspect, in accordance with one or more of the preceding aspects, the movement device further comprises at least a first sliding coupling interposed between a surface of the first conveyor element and the main oscillating arm and at least a second sliding coupling interposed between a surface of the second conveyor element and the main oscillating arm, the second sliding coupling being arranged in an opposite position to the first sliding coupling with respect to the rotation axis of the main oscillating arm.

In a further aspect in accordance with one or more of the preceding aspects, the first and/or the second sliding coupling define a solely resting relation on the surface of the respective conveyor element, or a solely resting relation on the main oscillating arm.

In a further aspect, in accordance with one or more of the preceding aspects, the movement device further comprises at least a transversal bar for each conveyor element constrained to the main oscillating arm on opposite sides with respect to the rotation axis, a transversal bar crossing the first conveyor element in a position comprised between the inlet end and the mobile end, the other transversal bar crossing the second conveyor element in a position comprised between the mobile end and the outlet end.

In a further aspect, in accordance with one or more of the preceding aspects, the switcher further comprises an auxiliary oscillating arm located on a side opposite the first and the second conveyor elements with respect to the main oscillating arm. The movement device further comprises two further sliding couplings interposed respectively between the surface of the first conveyor element and the auxiliary oscillating arm and between the surface of the second conveyor element and the auxiliary oscillating arm. The further sliding couplings are arranged in opposite positions with respect to the rotation axis of the main oscillating arm.

In a further aspect, in accordance with one or more of the preceding aspects, the transversal bars are constrained to the auxiliary oscillating arm in order to define therewith, and with the main oscillating arm, a rigid structure for transmission of drive.

In a further aspect, in accordance with one or more of the preceding aspects, the main oscillating arm is defined by an elongate element exhibiting opposite ends positioned at intermediate positions respectively of the first and the second conveyor element.

In a further aspect, in accordance with one or more of the preceding aspects, the auxiliary oscillating arm is defined by an elongate element exhibiting opposite ends that are positioned at an intermediate position respectively of the first and the second conveyor element.

In a further aspect, in accordance with one or more of the preceding aspects, the auxiliary oscillating arm is mobile in rotation about an axis coinciding with the rotation axis of the main oscillating arm.

In a further aspect, in accordance with one or more of the preceding aspects, the rotation axis of the main oscillating arm is positioned at the mobile end of the first and the second conveyor element in the aligned condition thereof.

In a further aspect, in accordance with one or more of the preceding aspects, the first and/or the second conveyor element comprise respective conveyor belts, in particular loop-wound, and configured such as to rotate respectively about the inlet end and the mobile end of the first conveyor element and about the mobile end and the outlet end of the second conveyor element.

In a further aspect, in accordance with one or more of the preceding aspects, the first and the second conveyor elements define, at least in the aligned condition, a conveyor direction between the inlet end and the first conveyor element and the outlet end of the second conveyor element; the transport direction is in particular from the inlet end to the outlet end or vice versa.

In a further aspect, in accordance with one or more of the preceding aspects, the first and/or the second sliding coupling comprise at least a respective rotary element, such as a wheel, in particular mounted idle, optionally in a solely resting relation, alternatively, on the surface of the respective conveyor element or on the main oscillating arm.

In a further aspect, in accordance with one or more of the preceding aspects, in the switching condition the transversal bars are neared to the respective mobile ends of the first and the second conveyor element with respect to the distance assumed in the aligned condition.

In a further aspect, in accordance with one or more of the preceding aspects, in a view from above the conveyor elements exhibit a rectangular shape conformation, two opposite sides of each conveyor element respectively defining the inlet end and the mobile end and the mobile end and the outlet end.

In a further aspect, in accordance with one or more of the preceding aspects, the switcher further comprises containing sides associated laterally to each conveyor element such as to prevent lateral exiting of the objects during transport.

In a further aspect in accordance with one or more of the preceding aspects, the first tilting axis and the second tilting axis lie in a same plane and are in particular parallel.

In a further aspect in accordance with one or more of the preceding aspects, the first tilting axis and the rotation axis lie in a same plane and are in particular parallel.

In a further aspect in accordance with one or more of the preceding aspects, the second tilting axis and the rotation axis lie in a same plane and are in particular parallel.

In a further aspect in accordance with one or more of the preceding aspects, the support structure comprises at least two longitudinal structural elements and two transversal structural elements joined to one another to form a rigid body. A transversal structural element supports the inlet end of the first conveyor element; and the other transversal structural element supports the outlet end of the second conveyor element. Each longitudinal structural element has at least a length which is equal to a longitudinal size of the first and the second conveyor element in the aligned condition. In a view from above, the longitudinal structural elements are located in particular externally with respect to the conveyor elements.

In a further aspect in accordance with one or more of the preceding aspects, the main oscillating arm and/or the auxiliary oscillating arm are, viewed from above, located between the conveyor elements and the longitudinal structural element.

In a further aspect in accordance with one or more of the preceding aspects, the movement device comprises a motor and a transmission for giving the main oscillating arm an oscillating motion about the rotation axis.

In a further aspect in accordance with one or more of the preceding aspects, the first sliding coupling and/or the second sliding coupling are rigidly constrained to the main oscillating arm and slide on the surface of the first conveyor element and/or the second conveyor element. In particular, a rotating element, such as a wheel, of the first sliding coupling and/or the second coupling element, defines the resting on the surface of the first conveyor element and/or the second conveyor element.

In a further aspect in accordance with one or more of the preceding aspects, in the switching condition the mobile ends are distanced from one another with respect to the plane passing through the first tilting axis and the second tilting axis by a distance of about equal to the sine of the angle of inclination a of the main oscillating arm by the length of the arm.

In a further aspect in accordance with one or more of the preceding aspects, the switcher further comprises at least a guide element provided with a shaped profile surface interposed between the surface of the first element and the main oscillating element. The first sliding at least partly slides on the shaped profile in order to determine variations in acceleration of the first conveyor element during movement thereof from the aligned condition to the switching condition, which variations are more uniform with respect to variations in acceleration of the first conveyor element in the same movement with the guide element absent.

In a further aspect in accordance with one or more of the preceding aspects, the movement device, and in particular the main oscillating arm, is slidably coupled only restingly to both the first and the second conveyor element. A sliding coupling zone in only resting relation to the first conveyor element is arranged in an opposite position to a respective sliding coupling zone in only resting relation to the second conveyor element with respect to the rotation axis of the main oscillating arm. In a further aspect in accordance with one or more of the preceding aspects, in the aligned condition the second conveyor element exhibits a lie plane that is inclined with respect to the lie plane of the first conveyor element. In particular, the mobile end of the second conveyor element is positioned inferiorly to the mobile end of the first conveyor element.

Further characteristics and advantages will better emerge from the detailed description that follows of some embodiments of a switcher.

BRIEF DESCRIPTION OF THE DRAWINGS

The description will be made herein below with reference to the accompanying figures of the drawings, provided merely by way of example, and therefore non-limiting, in which.

DETAILED DESCRIPTION

With reference to the figures of the drawings, reference numeral 1 denotes in its entirety a switcher.

As previously mentioned, the vertical switcher of the figures can be used in conveyor systems as a merge unit (from two lines to one), a diverge unit (from one line to two), or as a flow-balancing system. It can be used in belt sorting systems, in airport systems, also as a sorter or a bypass (as well as the merge, diverge and balancing functions), and lastly also upstream of sorters as a pre-sorting unit.

The switcher finds place in the market of automation and in particular in the airport, distribution, postal and parcel sectors.

From the point of view of the dimensions of the products to be treated (conveyed) and of parcel type dealt with using the switcher, note that these can be substantially of any type, by appropriately dimensioning the structure.

Purely by way of example, the switcher can be able to transport cartons, plastic containers, cellophane-wrapped products, rigid and soft baggages (in different materials, equipped with wheels, bindings, handles), and packages with non-uniform surfaces.

Also, as regards weights and dimensions, there can be variations (entirely non-limitingly) of from 0.25 to 60 Kg and with very small dimensions up to dimensions of 1400 (length)×900 (width)×900 (height).

Obviously the weights and dimensions mentioned above have been given entirely non-limitingly and by way of example with the aims of providing an indication of the operating flexibility of the switcher, further illustrating what might possibly be the heterogeneity of products conveyed and the different dimensions and geometries thereof.

Figure 1:
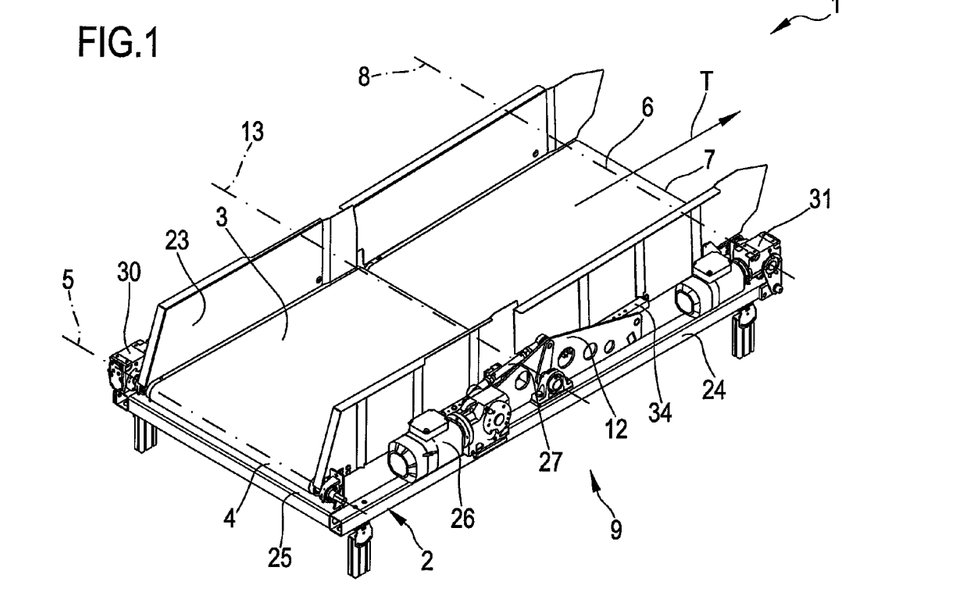
FIG. 1 is an exemplary switcher in an aligned first condition in accordance with various aspects of the disclosure.

Looking at FIG. 1, a switcher is illustrated, in particular a vertical switcher, which primarily comprises a first conveyor element 3 which is constrained to a structure or support frame 2, and is mobile by rotation about the frame at an inlet end 4 about a tilting axis 5, which is illustrated.

In particular, the first conveyor element 3 is defined by a conveyor belt or mat, moved by a respective motor 30, for example keyed on the tilting axis 5.

The conveyor belt 3 moves products thereon arranged or conveyed from the inlet end 4 towards the mobile end 10 or vice versa according to the motion imposed on the belt by the motor 30.

Observing the first conveyor element from above, note how it has a plan shape which is substantially rectangular, the width dimensions of which are such as to be enable transport of products of desired dimensions, while the length dimensions are such as to enable optimal distance between the mobile end of continuous conveyor belts in the switching condition, as will be more fully clarified herein below.

It is clear that the first conveyor element might, in specific further embodiments, be constituted by motorised roller planes or a combination of a plurality of aligned belts such as to define the same conveyor function of the belt shown in the figures, which are illustrated merely by way of example.

The switcher further comprises containing sides 23 laterally associated to the conveyor element 3 such as to prevent the exit of falling of objects during transport.

Obviously the containing sides 23 will have dimensions and structural characteristics that depend on the type of use the switcher is destined for.

In the aligned condition along a transport direction T, there is also a second conveyor element 6, also associated to the support structure 2 and also mobile in rotation at an outlet end 7 about a second tilting axis 8.

The second conveyor element 7 is entirely similar to the first conveyor element 3 described above, i.e. constituted by a conveyor belt or mat and moved by a motor 31, for example keyed at the second tilting axis 8.

It is clear that the second conveyor element too might, in further specific embodiments, be constituted by motorised roller planes or be defined by a combination of a plurality of aligned belts such as to define the same transporting function as the mat shown in the figures purely by way of example.

It is worthy of note that the switcher of the present description enables the conveyor elements 3, 6 to assume at least two operating conditions, a substantially aligned condition (FIG. 1 and FIG. 11) in which the mobile end 10 of the first conveyor element opposite the inlet end 4 and the mobile end 11 of the second conveyor element 6 opposite the outlet end are proximal and substantially flanked.

In the aligned condition the two mobile ends 10 and 11 are neared such that the conveyor belts do not interfere with one another in motion, but also such as not to create any gap, opening or discontinuity which in some way can lead to the fall of conveyed objects and/or jamming thereof.

In the aligned condition the objects are transported along the transport direction T, alternatively from the inlet end 4 to the outlet end 7 or vice versa.

The aligned condition in the waterfall configuration illustrated in FIG. 11 leads to arranging a mobile end 10, 11 below the other mobile end 11, 10 with respect to an advancement direction of the articles.

This configuration is advantageous as the articles advance on the belt exhibiting the superiorly-located free end and "fall" onto the following belt; jamming problems are therefore avoided, for example of articles with wheels or casters (for example cases or baggages with casters).

Note also that changing the configuration of planarity of the conveyor elements (FIG. 1) to the waterfall configuration (FIG. 11) is obtained by simply positioning at a higher level the tilting axis (5, 8) of the conveyor element that will have the free end thereof inferiorly located.

For example, suitable engaging bodies 33 can be present on the support structure 2, having differentiated height (for example constraining perforations at two different heights) such as to constrain the corresponding conveyor element in the zone of the tilting axis at the desired level.

As will become clear in the following, thanks to the constraints present on the conveyor elements, no substantial intervention is required for changing configuration.

The switcher further also comprises a movement device 9 able to move the first and the second conveyor element 3, 6 at least about the relative tilting axis 5, 8.

Thanks to the movement means 9 the first and the second transport elements 3, 6 can be configured in a switching condition (illustrated in FIG. 2) in which the mobile ends 10, 11 are distanced in height from one another in order to enable passage of one or more objects crossing between the mobile ends.

Regarding this, note that the operating configurations assumed by the systems internally of which the illustrated switcher can be inserted are numerous.

Figure 2:
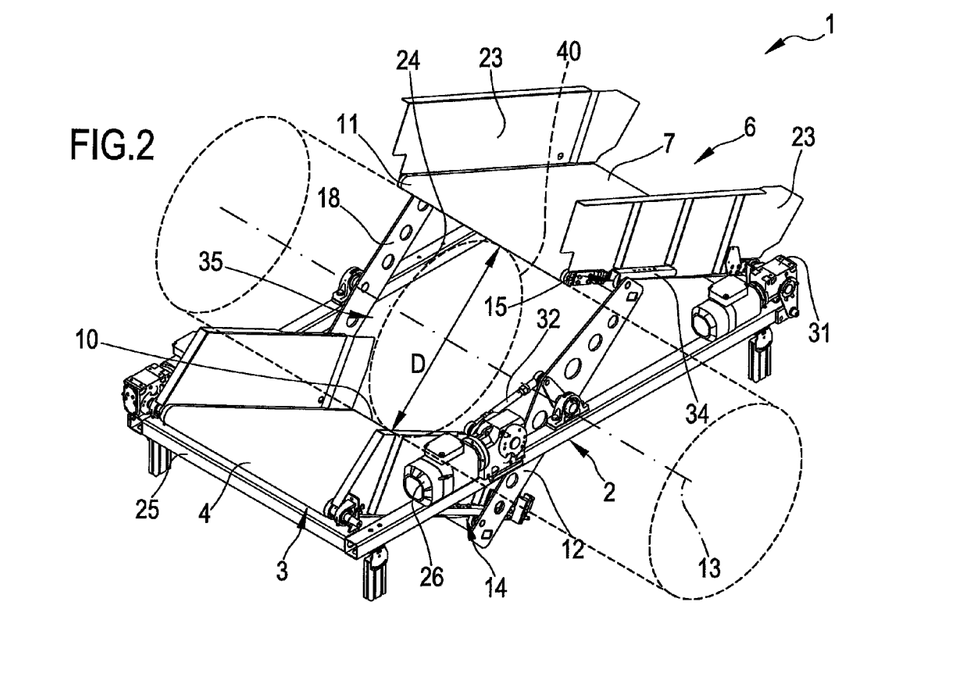
FIG. 2 is the switcher of FIG. 1 in a second switching condition.
Figure 3:
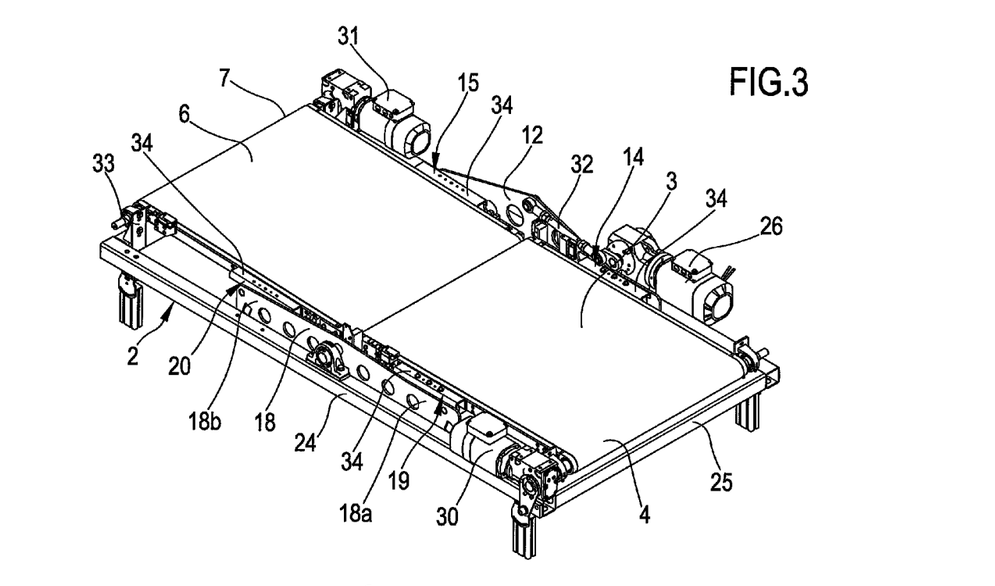
FIGS. 3 and 4 show, with some parts removed better to evidence others, a switcher in the conditions of FIGS. 1 and 2 respectively.

Purely by way of example, and considering a transport direction from the first element 3 towards the second element 6, in the condition of FIG. 1 the product is simply transported from the first to the second conveyor belt illustrated therein, while in the configuration of FIG. 2 the product in inlet to the first conveyor element 3 is brought to a lower level, where for example a further movement system, such as a further conveyor belt, on a different level, will collect the product such as to sort it correctly.

Obviously, apart from the condition of FIG. 2, a further switching condition can be defined in which the first conveyor element 3 is positioned inclined upwards, bringing a further product in inlet to a further transport system positioned superiorly of the switcher.

Thus, and without going into further description and details relevant to the aims of the present description, note exclusively that the switcher can be used as a modular element to be included in more complex systems such as to perform, in an extremely flexible way, the operations of switching/sorting and also by-pass operations.

Passing on to an examination of the movement device 9, note how the device primarily comprises a main oscillating arm 12 which is mobile about a rotation axis 13.

This movement is illustrated by a comparison of FIGS. 1 and 2 or 7 and 8.

Note that in the illustrated embodiment (FIG. 1) the first tilting axis 5 and the second tilting axis 8 lie in the same plane and in particular are parallel, just like the first tilting axis 5 and the rotation axis 13 and the second tilting axis 8 and the rotation axis 13 lie in the same plane, being all parallel two-by-two.

Figure 11:
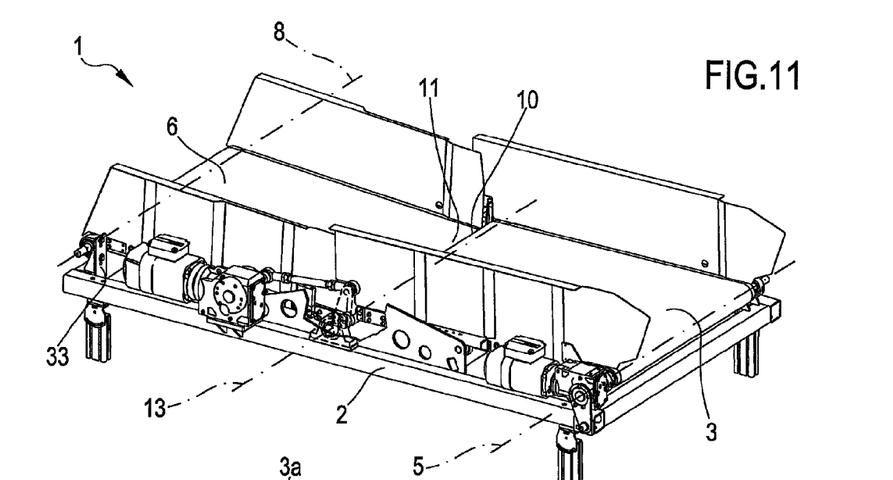
FIG. 11 is a lateral schematic view of the switcher of FIG. 1 with conveyor elements in the cascade or "waterfall" condition.

FIG. 11, as described above, illustrates a condition in which a tilting axis is at a different height with respect to the other tilting axis (and to the rotation axis 13) in order to define a waterfall configuration (the axes however remain parallel).

Note however that this parallel condition, though optimal, is not strictly necessary as the tilting axes 5, 8 can certainly lie in the same plane but not be parallel to one another.

The rotation axis 13, shown in the figures, is also contained in the same plane which contains the tilting axis 5 and the tilting axis 8, but might not necessarily be there and, with more complex movement configurations, might not be parallel or lie only in a parallel plane to the plane of the tilting axis.

Figure 4:
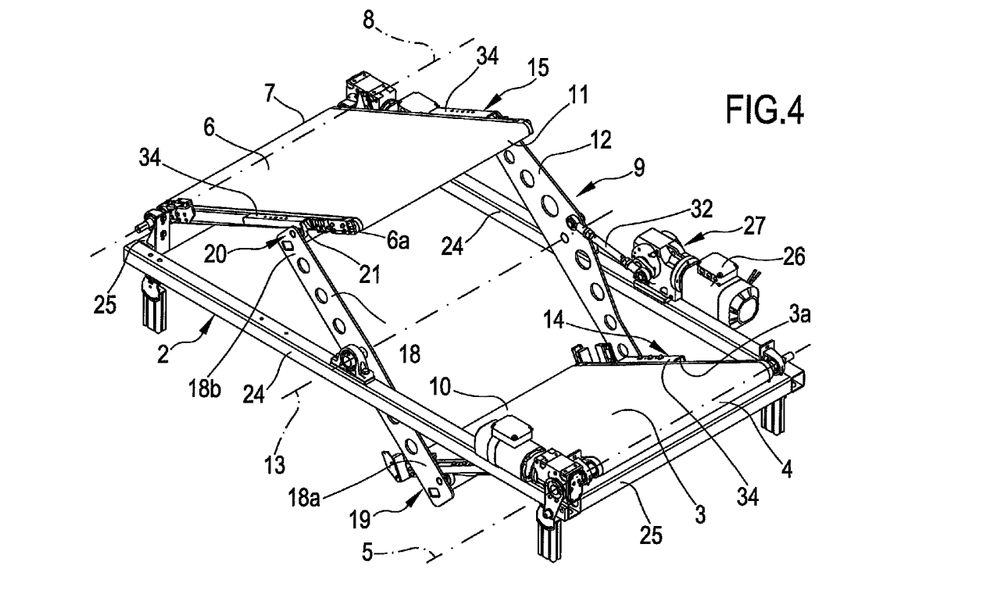
Figure 5:
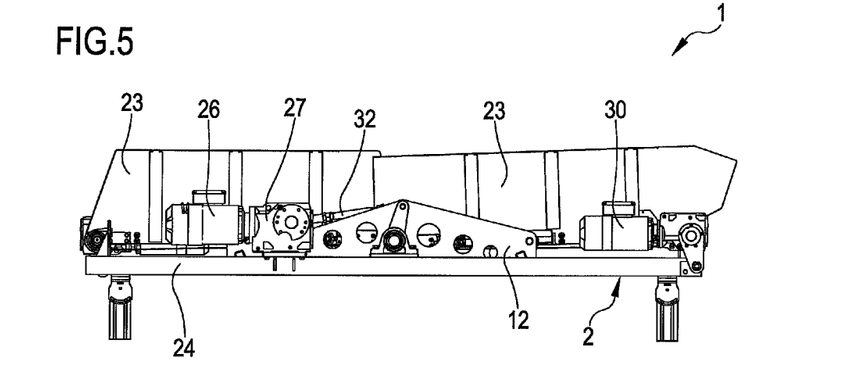
FIGS. 5 and 6 are lateral views of the switcher of FIGS. 1 and 2, in the two different operating conditions.
Figure 8:
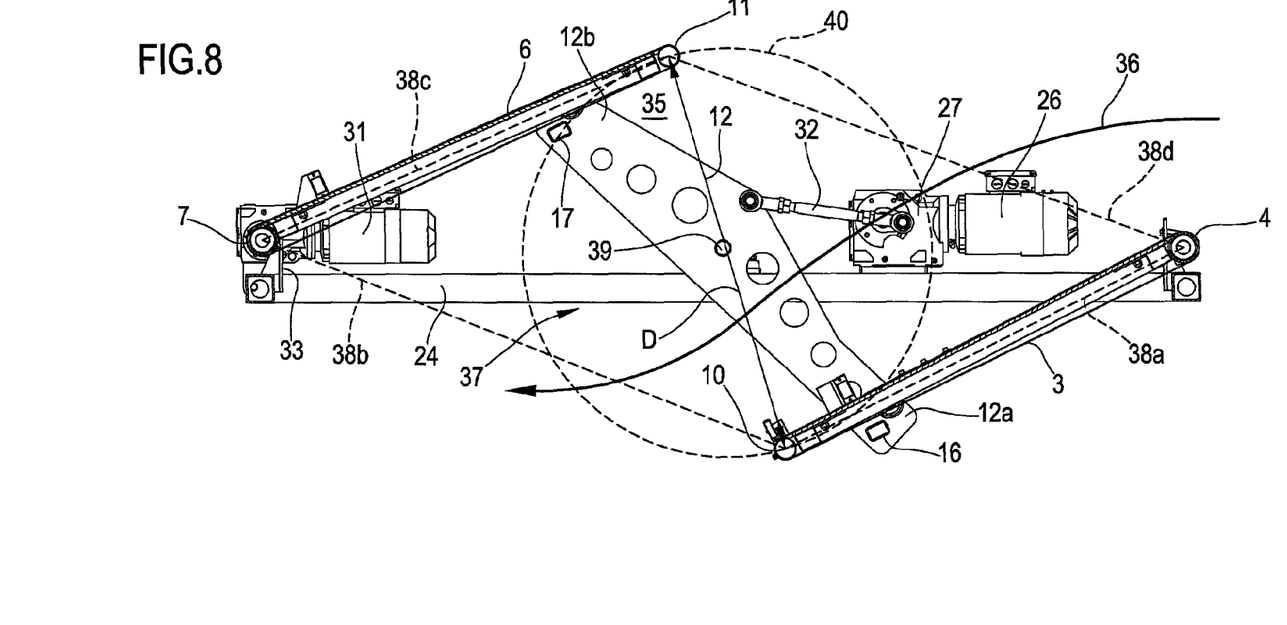

Looking at FIG. 8, which represents the switcher of FIG. 4 in the switching condition in longitudinal section along a median plane, note how the trace 39 of the rotation axis 13 (i.e. the point of intersection between the axis 13 and the section plane) is contained in an imaginary polygonal area 37 defined by four sides. A first side 38a substantially coincides with the length of the first conveyor element 3 when in the switching condition. The second side 38b consecutive to the first side conjoins the mobile end 10 of the first conveyor element 3 with the outlet end 7 of the second conveyor element 6. The third side 38c, consecutive to the second, coincides with the length of the second conveyor element 6 when in the switching condition. The fourth side 38d, consecutive to the third, conjoins the mobile end 11 of the second conveyor element 6 with the inlet end 4 of the first conveyor element 3.

In this way the compactness of the movement device 9 is guaranteed, as it does not occupy space (in particular in the zone below the conveyor belts) beyond the zones of potential interference with the conveyor elements themselves, as happens in switchers in the prior art.

In general, the known switchers exhibit, at the rotation axis of the device destined to transmit the motion, a shaft which is necessary for transferring the motion from the opposite side of the device.

In the present embodiment, though maintaining the transfer of the motion from one side to another of the device (obtained in the specific embodiment by means of the use of sliding constraints and the transversal bars 16, 17), no drive transmission shaft is present having an axis that coincides with the rotation axis of the main oscillating arm.

In other terms, in the switching condition, the mobile end 10 of the first conveyor element 3 and the mobile end 11 of the second conveyor element 6 are distanced, defining a crossing passage 35 configured for enabling passage of one or more objects crossing between the mobile ends 10, 11 along an operating pathway 36 between the inlet end 4 of the first conveyor element 3 and a destination zone located beyond the mobile end 10 of the first conveyor element 3 and beyond the crossing passage 35; in the switching condition of the conveyor elements 3, 5, the rotation axis 13 (or its trace if we observe the longitudinal section) is along the operating pathway 36 in an interfering position with the objects passing on the conveyor elements 3,6.

In fact, in the condition of passage of objects having a size equal to about the size of the crossing passage 35, the presence of the rotation axis 13 to which no drive transmission shaft corresponds does not create any problem of inference in the functioning of the device.

In the switching condition, the mobile end 10 of the first conveyor element 3 and the mobile element 11 of the second conveyor element 6 are at an operating distance D. In this condition the rotation axis 13 of the main oscillating arm 12 is contained internally of a circumference 40 having a diameter equal to the operating distance D and passing through the mobile ends 10, 11 when they are in the switching condition (FIG. 8).

The above-mentioned main oscillating arm 12 is substantially defined by a plate-shaped elongate element specially lightened by means of perforations, which exhibits opposite ends 12a, 12b which are positioned at intermediate zones respectively of the first and the second conveyor element 3, 6 along the transport direction T.

The arm 12 is hinged to the support structure 2 such as to rotate about the axis 13.

The length of the main oscillating arm can be comparable to the length of a conveyor element, such that in the assembled condition the ends 12a, 12b are substantially at the halfway line of each of the two conveyor elements 3, 6 as the main oscillating arm 12 itself is positioned straddled on the two conveyor belts.

An auxiliary oscillating arm 18 is present on the opposite side with respect to the first and the second conveyor element 3, 6, which arm 18 has similar characteristics to those of the main oscillating arm 12.

In detail, the auxiliary oscillating arm 18 is defined by an elongate element, in particular lightened by perforations, exhibiting opposite ends 18a, 18b positioned at the intermediate position respectively of the first and the second conveyor elements 3, 6 along the transport direction T.

The auxiliary oscillating arm 18 is mounted specularly and has a substantially identical geometry to the main oscillating arm 12; obviously the auxiliary oscillating arm 18 is also mobile in rotation about the axis 13.

Note that the rotation axis 13 of the two oscillating arms 12, 18 is positioned at the mobile ends 10, 11 of the first and the second conveyor element in the alignment condition thereof.

The movement device 9 is further provided with at least a transversal bar 16, 17 for each conveyor element 3, 6, which is constrained to the main oscillating arm 12 on opposite sides with respect to the rotation axis 13 and develops parallel to the axis and perpendicularly to the main oscillating arm 12.

In detail, a transversal bar 16 inferiorly crosses the first conveyor element 3 in a position comprised between the inlet end 4 and the mobile end 11, the other transversal bar 17 crosses the second conveyor element 6 in a position comprised between the mobile end 11 and the outlet end 7.

Figure 9:
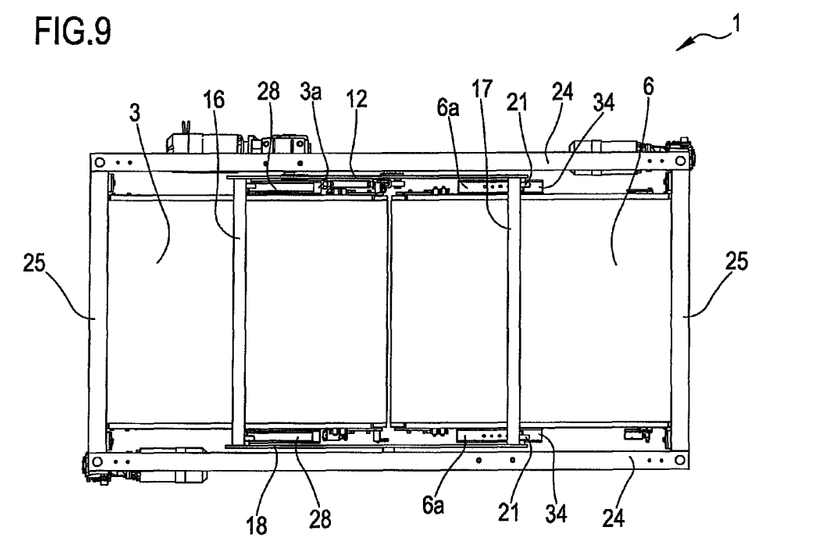
FIGS. 9 and 10 are views from below of the switcher of FIG. 1 in the aligned and switched conditions.
Figure 10:
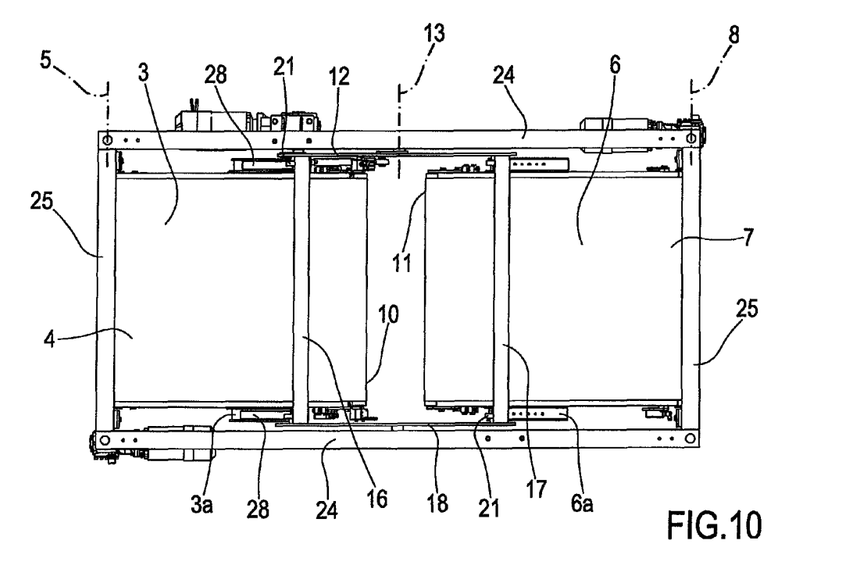

As can be seen in FIGS. 9 and 10, the transversal bars 16, 17 are constrained to the main oscillating arm 12 and the auxiliary arm 18 such as to define therewith a rigid looped drive transmission structure, and in particular a rectangular frame in which the transversal bars 16, 17 superiorly receive respectively the first and the second conveyor elements 3, 6, as illustrated.

Also note that the transversal bars 16, 17 can move (in particular without contact) relatively to the lower surface of the respective conveyor element 3, 6.

Observing FIG. 9 in particular, with the switcher in the aligned condition and comparing it to the FIG. 10 with the switcher in the switching condition, note how the transversal bars 16, 17 are closer to the respective mobile ends 10, 11 of the first and the second conveyor element 3, 6 with respect to the distance assumed in the aligned condition (FIG. 9).

As can be seen in FIGS. 5 to 8, the movement device 9 is slidably coupled to each of the conveyor belts 3, 6; for this purpose the movement device 9 advantageously comprises at least a first sliding coupling 14 interposed between a surface 3a of the first conveyor element 3 and the main oscillating arm 12 and at least a second sliding element 15 interposed between the surface 6a of the second conveyor element 6 and the main oscillating arm 12.

In particular, the first and the second sliding coupling 14, 15 are positioned in opposite positions with respect to the rotation axis 13 of the main oscillating arm 12 such as to operate, as mentioned, on a respective conveyor element.

In other terms, the point of contact between the movement means 9 of each of the conveyor elements 3, 6 varies in motion between the aligned condition and the switching condition or vice versa.

Figures 12, 13:
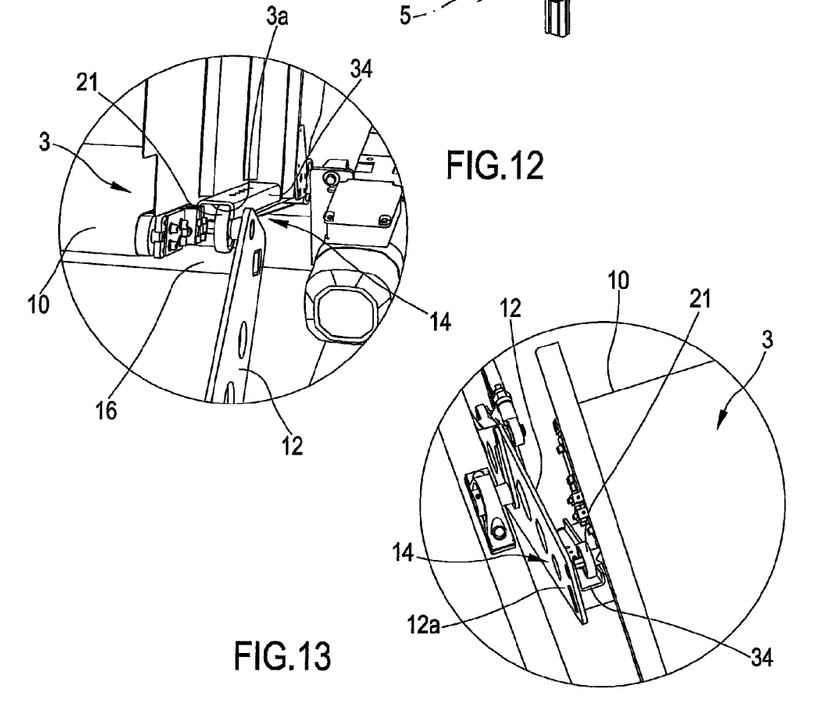
FIG. 12 illustrates a detail of the switcher in a first embodiment.
FIG. 13 illustrates a detail of the switcher in a second embodiment.

Also note that in the figures the relation is solely a resting one, i.e. the first and the second sliding coupling 14, 15 are exclusively rested on (and can rotate in at least a constitutive component with respect to) the surface 3a, 6a, of the respective conveyor element 3, 6 (see also the detail of FIG. 12); in an alternative embodiment illustrated in FIG. 13, the first and the second sliding coupling 14, 15 are in solely resting and rotation relation on the main oscillating arm 12.

However the solely resting relation, in particular a resting at the lower surfaces of the first and the second conveyor element, is exclusively by way of example, though extremely advantageous.

Other sliding coupling situations, such as a skate constraint, can equally be used.

In other terms, the movement means 9 can engage in respective sliding guides of the conveyor elements in such a way that it is not possible to distance the first and/or the second conveyor elements 3, 6, from the movement means 9, i.e. from the main oscillating bar 12.

Obviously, alternatively, the guides can be defined on the oscillating arm and suitable pins or rotating elements present on the conveyor elements 3, 6 will newly define a skate coupling condition.

Note however that the presence of a solely resting relation (such as the relation in the illustrated embodiments) can lead to important advantages, in particular in the displacement from the switching condition to the aligned condition; in fact, where for any reason an object is jointed to or passes into the space defined between the two mobile ends 10, 11 of the conveyor elements 3, 6 during the step of closure towards the aligned condition (situation of shearing of the article which might occur in a case of malfunctioning of the device and in detail of the control system), a resting relation only (and not a skate-type guide) invokes a distancing of the transversal bars and the relative sliding couplings from the conveyor element positioned superiorly without the movement means 9 generating any pressure or force on the conveyor element in order to return it into the aligned condition; also, the resting-only relation is advantageous from the point of view of maintenance as the technical expert when performing an intervention can lift both the conveyor elements into the vertical position, freeing access to all parts of the structure and also creating space in which to operate.

It is clear that the special structure of the movement means which exhibit the main and auxiliary oscillating arms 12, 18 and the transversal bars 16, 17 enables a transmission of the drive with an extremely rigid structure and thus prevents generation of transmission of forces non-uniformly and non-homogeneously, as well as oscillations or dealignments of the structure.

From the structural point of view, the first and/or the second sliding element 14, 15 exhibit at least a respective element able to guarantee a rotating coupling, optionally in a solely resting relation, alternatively resting and rotating on the surface 3a, 6a of the respective conveyor element 3, 6 (see for example FIG. 12) or resting and rotating on the main oscillating arm 12 (see for example FIG. 13).

The illustrated examples show the presence of rotating elements, such as wheels 21, in particular mounted idle, rotatably constrained to the ends 12a, 12b of the main oscillating arm.

The wheel 21 defines the solely resting relation and enables, thanks to rotation thereof, an easier movement between the aligned and switched conditions.

In particular the sliding element exhibits respective rest and sliding guides 34, for example C-shaped, in which the rest plate defines the sliding surfaces 3a, 6a.

It is however clear that a specular and alternative mounting in which the rotating element is vice-versa constrained to the conveyor elements 3, 6 resting and rotating on the oscillating arm 12 (for example on rest and sliding guides 34 rigidly constrained to the arm 12) is absolutely equivalent and comprised in the illustrated concept.

Obviously the movement device 9 comprises two further sliding couplings 19, 20 interposed respectively between the surface 3a of the first conveyor element 3 and the auxiliary oscillating arm 18 between the surface 6a of the second conveyor element and the auxiliary oscillating element 18.

The further sliding couplings 19, 20 are also located in opposite positions with respect to the rotation axis 13 of the main oscillating arm 12.

In still other terms, the resting/coupling structures between the movement means 9 at the auxiliary oscillating arm 18 are identical to those at the main oscillating arm 12.

As illustrated in the figures, the movement device 9 comprises a motor 26 and a transmission 27 for giving the main oscillating arm 12 an oscillating motion about the rotation axis 13.

For this purpose a con rod 32 belonging to the transmission 27 is hinged to a plate-shaped portion of the main oscillating arm which is superiorly located with respect to the rotation axis 13.

The movement imparted leads to oscillation of the main oscillating arm 12 about the rotation axis 13 between a position of maximum inclination (however considerably distant from the dead centre) to an aligned condition.

As can be seen in FIG. 8, in switching condition, the mobile ends 10, 11 are reciprocally distanced with respect to the plane passing through the first tilting axis 5 and through the second tilting axis 8 in particular by a distance of about half the sine of the angle of inclination a of the main oscillating arm 12 multiplied by the length of the arm.

The contact points between the conveyor elements 3, 6 and the movement means 9 are substantially defined at the ends 12a, 12b of the oscillating arm.

By suitably dimensioning the length of the oscillating arm 12 and the maximum angle of inclination a the distance between the mobile ends is determined, which defines the free passage area for the objects to be transported in the switching condition.

Also worthy of note is that fact that in the movement from the aligned condition to the switching condition, due to the sliding coupling between the movement means 9 and the conveyor means 3, 6 (incidentally a solely resting coupling) extremely variable accelerations will take place.

In fact, starting from the aligned condition, the conveyor element which is deviated upwards is subjected to a sharp acceleration which gradually diminishes; equally the conveyor belt deviated downwards, being in a solely resting relation, might lose contact in the first instants of lowering; this in particular would occur when the opening/closing velocity of the switcher were high (this is often a desired condition).

Figure 6:
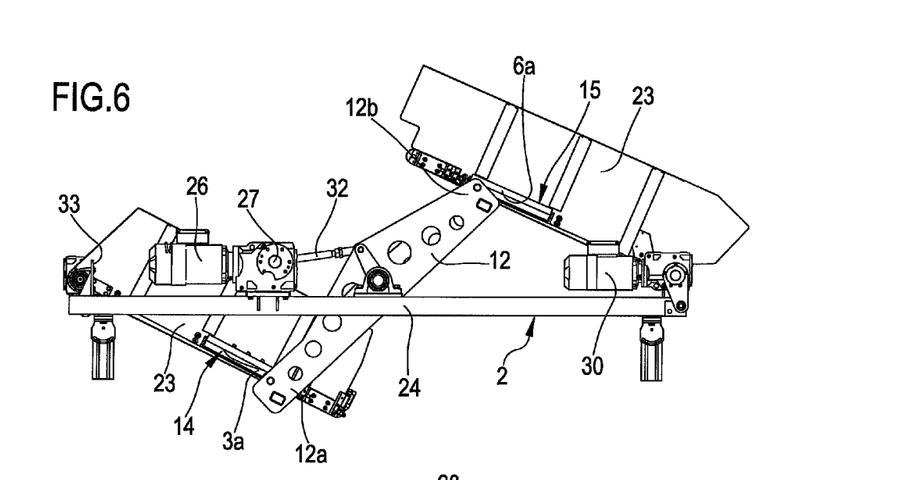
Figure 6A:
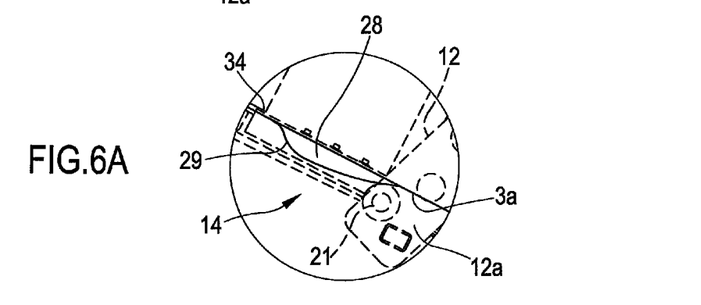
FIG. 6a illustrates an enlarged detail of FIG. 6.
Figure 7:
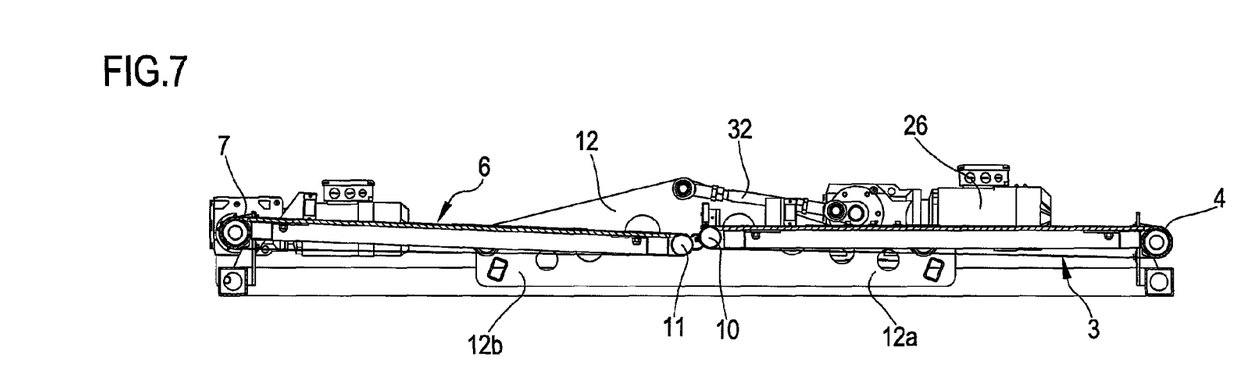
FIGS. 7 and 8 illustrate, in a lateral view, the movement device in the two operating conditions of FIGS. 1 and 2.

With the aim of resolving this drawback, it is possible to predispose at least a guide element 28 provided with a suitable surface having a shaped profile (see FIG. 6a).

This guide element is interposed between the surface of the respective conveyor element 3, 6 and the main oscillating arm 12; for example it is inserted in the C-profile defined by the resting and sliding guides 34.

Although the guide is theoretically positionable in all the sliding guides 34, it is advantageous to associate it (on the left and right mainly for reasons of symmetry) to the conveyor element which is moved downwards (FIG. 6).

In particular, the first sliding coupling 14 (generally the rotating element 21) slides, at least partly, on the shaped profile 29 such as to determine different variations of acceleration of the first conveyor element 3; during the movement from the aligned condition to the switching condition the profile will be such that the variations are cancelled or in any case more uniform with respect to the variations of acceleration of the first conveyor element and in the movement in the absence of the guide element 28.

In still further terms, without electronically managing the various accelerations with the complications of programming and determining optimal movements, velocity and accelerations as a function of the geometry of the device, it is possible to associate a suitably-shaped mechanical element by interposing it between the rotating element (destined to slide on the shaped profile) and the corresponding conveyor element.

In this way the coupling surfaces are modified, thus changing the accelerations.

By suitably shaping the profile 29 it is possible to reduce the accelerations in the initial stage of moving from the aligned condition, while maintaining the performance of the switcher in terms of totally unaltered velocity (the same number of possible openings/closings in the time unit).

Lastly, from a general point of view, note how the support structure 2 comprises two longitudinal structural elements 24 and two transversal structural elements 25 joined to one another rigidly such as to form a solid structure.

In particular, the transversal structural element 25 supports the inlet end 4 of the first conveyor element 3 while the other transversal structural element 5 supports the outlet end 7 of the second conveyor element.

The motors too can be supported by the elements in particular at the joint between the longitudinal structural elements 24 and the transversal structural elements 25 such as to be positioned in alignment of the tilting axes 5, 8.

Note that each longitudinal structural element 24 has a length which is at least equal to the overall longitudinal size of the first and the second conveyor elements 3, 6.

In the aligned condition, in a view from above, the longitudinal structural elements 24 are located in particular externally with respect to the conveyor elements, 3, 6.

Still on this subject, the main oscillating arm 12 and/or the auxiliary oscillating arm 16 are, again in a view from above, interposed between the conveyor elements 3, 6 and the longitudinal structural element 24.

The predisposing of a support structure 2 as described and illustrated enables maintaining the volume of the switcher substantially comparable to the conveyor elements 3, 6.

Further, the presence of the special movement means 9 as described considerably reduces the height volume of the whole device which is therefore very contained and in fact principally defined by the height of the containing sides 23.

The presence of a solely resting constraint provides the switcher with a further guarantee of functional safety also in a case of shearing, and further much facilitates maintenance operations as clarified herein above.

Also, simply by modifying the height of one of the two tilting axes it is possible to reconfigure the switcher in one of the alternative conditions of FIG. 1 or 11; this possibility is once more guaranteed by the type of constraint of the movement means with respect to the conveyor elements. By modifying the height of the tilting axis, the corresponding conveyor element will be configured inclined along a plane containing the tilting axis and the axis passing through the rest points of the element on the movement means.

It will be apparent to those skilled in the art that various modifications and variations can be made to the switcher of the present disclosure without departing from the scope of the invention. Throughout the disclosure, use of the terms "a," "an," and "the" may include one or more of the elements to which they refer. Other embodiments of the invention will be apparent to those skilled in the art from consideration of the specification and practice of the invention disclosed herein. It is intended that the specification and examples be considered as exemplary only.

What is claimed is:

1. A switcher, comprising
a support structure;
a first conveyor element associated to the support structure and mobile in rotation at an inlet end thereof about a first tilting axis;
a second conveyor element associated to the support structure and mobile in rotation at an outlet end thereof about a second tilting axis; and
a movement device configured for moving the first and the second conveyor elements about the respective tilting axes thereof, the movement device configuring the first and the second conveyor element between a condition of substantial alignment in which a mobile end of the first conveyor element opposite the inlet end and a mobile element of the second conveyor element opposite the outlet end are in reciprocal proximity and substantially flanked and a switching condition in which the mobile ends are distanced from one another in order to enable a passage of one or more objects which are crossing between the mobile ends, the movement device comprising a main oscillating arm which is mobile about a rotation axis, wherein the movement device is slidably coupled both to the first and to the second conveyor element, a sliding coupling zone to the first conveyor element being arranged in an opposite position to a respective sliding coupling zone to the second conveyor element with respect to the rotation axis of the main oscillating arm,
wherein no drive transmission shaft is present having an axis coinciding with the rotation axis.

2. The switcher of claim 1, wherein, in a longitudinal section according to a median plane, a trace line of the rotation axis is contained in a polygonal area defined by four sides, a first side coinciding with a length of the first conveyor element when in the switching condition; a second side consecutive to the first conjoining the mobile element of the first conveyor element with the outlet end of the second conveyor element; a third side consecutive to the second, coinciding with a length of the second conveyor element when in the switching condition; a fourth side consecutive to the third, conjoining the mobile end of the second conveyor element with the inlet end of the first conveyor element.

3. The switcher of claim 1, wherein in the switching condition the mobile end of the first conveyor element and the mobile end of the second conveyor element are distanced, defining a crossing passage configured such as to enable passage of one or more objects crossing between the mobile ends along an operating pathway between the inlet end of the first conveyor element and a destination zone located beyond the mobile end of the first conveyor element and beyond the crossing passage, in the switching condition of the conveyor elements the rotation axis being located along the operating pathway in an interfering position with the objects passing on the conveyor elements and having dimensions equal to about the size of the crossing passage.

4. The switcher of claim 1, wherein in the switching condition the mobile end of the first conveyor element and the mobile end of the second conveyor element are at an operating distance, the rotation axis of the main oscillating arm being contained internally of a circumference having a diameter equal to the operating distance passing through the mobile ends in the switching condition.

5. The switcher of claim 1, wherein the movement device further comprises at least a first sliding coupling interposed between a surface of the first conveyor element and a main oscillating arm and at least a second sliding coupling interposed between a surface of the second conveyor element and the main oscillating arm, the second sliding coupling being arranged in an opposite position to the first sliding coupling with respect to the rotation axis of the main oscillating arm.

6. The switcher of claim 5, wherein the first or the second sliding coupling define a solely resting relation on the surface of the respective conveyor element, or a solely resting relation on the main oscillating arm.

7. The switcher of claim 1, wherein the movement device further comprises at least a transversal bar for each conveyor element constrained to the main oscillating arm on opposite sides with respect to the rotation axis, a transversal bar crossing the first conveyor element in a position comprised between the inlet end and the mobile end, the other transversal bar crossing the second conveyor element in a position comprised between the mobile end and the outlet end.

8. The switcher of claim 1, further comprising an auxiliary oscillating arm located on a side opposite the first and the second conveyor elements with respect to the main oscillating arm, the movement device further comprising two further sliding couplings interposed respectively between the surface of the first conveyor element and the auxiliary oscillating arm and between the surface of the second conveyor element and the auxiliary oscillating arm, the further sliding couplings being arranged in opposite positions with respect to the rotation axis of the main oscillating arm.

9. The switcher of claim 1, wherein the main oscillating arm is defined by an elongate element exhibiting opposite ends positioned at intermediate positions respectively of the first and the second conveyor element.

10. The switcher of claim 1, wherein the first or the second sliding coupling comprise at least a respective rotating element, mounted idle.

11. The switcher of claim 10, wherein the respective rotating element is in a solely resting relation alternatively on the surface of the of the respective conveyor element or on the main oscillating arm.

12. The switcher of claim 1, wherein the support structure comprises at least two longitudinal structural elements and two transversal structural elements joined to one another to form a rigid body, a transversal structural element supporting the inlet end of the first conveyor element, the other transversal structural element supporting the outlet end of the second conveyor element, each longitudinal structural element having at least a length which is equal to a longitudinal size of the first and the second conveyor element in the aligned condition, in a view from above.

13. The switcher of claim 12, wherein the longitudinal structural elements are located externally with respect to the conveyor elements.

14. The switcher of claim 1, wherein the first sliding coupling or the second sliding coupling are rigidly constrained to the main oscillating arm and slide on the surface of the first conveyor element or of the second conveyor element, a rotating element, being a wheel, of the first sliding coupling or of the second coupling, resting on the surface of the first conveyor element or of the second conveyor element.

15. The switcher of claim 1, further comprising at least a guide element provided with a shaped profile surface interposed between the surface of the first element and the main oscillating arm, the first sliding coupling at least partly sliding on the shaped profile in order to determine variations in acceleration of the first conveyor element during movement thereof from the aligned condition to the switching condition, which variations are more uniform with respect to variations in acceleration of the first conveyor element in the same movement in an absence of the guide element.

16. A switcher, comprising
a support structure;
a first conveyor element associated to the support structure and mobile in rotation at an inlet end thereof about a first tilting axis;
a second conveyor element associated to the support structure and mobile in rotation at an outlet end thereof about a second tilting axis; and
a movement device configured for moving the first and the second conveyor elements about the respective tilting axes thereof, the movement device configuring the first and the second conveyor element between a condition of substantial alignment in which a mobile end of the first conveyor element opposite the inlet end and a mobile element of the second conveyor element opposite the outlet end are in reciprocal proximity and substantially flanked and a switched condition in which the mobile ends are distanced from one another in order to enable a passage of one or more objects which are crossing between the mobile ends, the movement device comprising a main oscillating arm which is mobile about a rotation axis, wherein the movement device is slidably coupled both to the first and to the second conveyor element, a sliding coupling zone to the first conveyor element being arranged in an opposite position to a respective sliding coupling zone to the second conveyor element with respect to the rotation axis of the main oscillating arm,
wherein the movement device further comprises at least a first sliding coupling interposed between a surface of the first conveyor element and a main oscillating arm and at least a second sliding coupling interposed between a surface of the second conveyor element and the main oscillating arm, the second sliding coupling being arranged in an opposite position to the first sliding coupling with respect to the rotation axis of the main oscillating arm.

17. A switcher, comprising
a support structure;
a first conveyor element associated to the support structure and mobile in rotation at an inlet end thereof about a first tilting axis;
a second conveyor element associated to the support structure and mobile in rotation at an outlet end thereof about a second tilting axis; and
a movement device configured for moving the first and the second conveyor elements about the respective tilting axes thereof, the movement device configuring the first and the second conveyor element between a condition of substantial alignment in which a mobile end of the first conveyor element opposite the inlet end and a mobile element of the second conveyor element opposite the outlet end are in reciprocal proximity and substantially flanked and a switching condition in which the mobile ends are distanced from one another in order to enable a passage of one or more objects which are crossing between the mobile ends, the movement device comprising a main oscillating arm which is mobile about a rotation axis, wherein the main oscillating arm is slidably coupled both to the first and to the second conveyor element, a sliding coupling zone to the first conveyor element being arranged in an opposite position to a respective sliding coupling zone to the second conveyor element with respect to the rotation axis of the main oscillating arm and wherein, in a longitudinal section according to a median plane, a trace line of the rotation axis is contained in a polygonal area defined by four sides, a first side coinciding with a length of the first conveyor element when in the switching condition; a second side consecutive to the first conjoining the mobile element of the first conveyor element with the outlet end of the second conveyor element; a third side consecutive to the second, coinciding with a length of the second conveyor element when in the switching condition; a fourth side consecutive to the third, conjoining the mobile end of the second conveyor element with the inlet end of the first conveyor element.

18. A switcher, comprising
a support structure;
a first conveyor element associated to the support structure and mobile in rotation at an inlet end thereof about a first tilting axis;
a second conveyor element associated to the support structure and mobile in rotation at an outlet end thereof about a second tilting axis; and
a movement device configured for moving the first and the second conveyor elements about the respective tilting axes thereof, the movement device configuring the first and the second conveyor element between a condition of substantial alignment in which a mobile end of the first conveyor element opposite the inlet end and a mobile element of the second conveyor element opposite the outlet end are in reciprocal proximity and substantially flanked and a switching condition in which the mobile ends are distanced from one another in order to enable a passage of one or more objects which are crossing between the mobile ends, the movement device comprising a main oscillating arm which is mobile about a rotation axis, the movement device further comprising at least a transversal bar for each conveyor element constrained to the main oscillating arm on opposite sides with respect to the rotation axis, a transversal bar crossing the first conveyor element in a position comprised between the inlet end and the mobile end, the other transversal bar crossing the second conveyor element in a position comprised between the mobile end and the outlet end, wherein the movement device is slidably coupled both to the first and to the second conveyor element, a sliding coupling zone to the first conveyor element being arranged in an opposite position to a respective sliding coupling zone to the second conveyor element with respect to the rotation axis of the main oscillating arm and wherein in the switching condition the mobile end of the first conveyor element and the mobile end of the second conveyor element are at an operating distance, the rotation axis of the main oscillating arm being contained internally of a circumference having a diameter equal to the operating distance passing through the mobile ends in the switching condition.

19. A switcher, comprising
a support structure;
a first conveyor element associated to the support structure and mobile in rotation at an inlet end thereof about a first tilting axis;
a second conveyor element associated to the support structure and mobile in rotation at an outlet end thereof about a second tilting axis; and
a movement device configured for moving the first and the second conveyor elements about the respective tilting axes thereof, the movement device configuring the first and the second conveyor element between a condition of substantial alignment in which a mobile end of the first conveyor element opposite the inlet end and a mobile element of the second conveyor element opposite the outlet end are in reciprocal proximity and substantially flanked and a switched condition in which the mobile ends are distanced from one another in order to enable a passage of one or more objects which are crossing between the mobile ends, the movement device comprising a main oscillating arm which is mobile about a rotation axis, wherein the movement device is slidably coupled both to the first and to the second conveyor element, a sliding coupling zone to the first conveyor element being arranged in an opposite position to a respective sliding coupling zone to the second conveyor element with respect to the rotation axis of the main oscillating arm, the movement device further comprising at least a transversal bar for each conveyor element constrained to the main oscillating arm on opposite sides with respect to the rotation axis, a transversal bar crossing the first conveyor element in a position comprised between the inlet end and the mobile end, the other transversal bar crossing the second conveyor element in a position comprised between the mobile end and the outlet end.

20. The switcher of claim 19, wherein, in a longitudinal section according to a median plane, a trace line of the rotation axis is contained in a polygonal area defined by four sides, a first side coinciding with a length of the first conveyor element when in the switching position; a second side consecutive to the first conjoining the mobile element of the first conveyor element with the outlet end of the second conveyor element; a third side consecutive to the second, coinciding with a length of the second conveyor element when in the switching condition; a fourth side consecutive to the third, conjoining the mobile end of the second conveyor element with the inlet end of the first conveyor element.

21. The switcher of claim 19, wherein the movement device further comprises at least a first sliding coupling interposed between a surface of the first conveyor element and a main oscillating arm and at least a second sliding coupling interposed between a surface of the second conveyor element and the main oscillating arm, the second sliding coupling being arranged in an opposite position to the first sliding coupling with respect to the rotation axis of the main oscillating arm.

22. The switcher of the preceding claim 21, wherein the first or the second sliding coupling define a solely resting relation on the surface of the respective conveyor element, or a solely resting relation on the main oscillating arm.

23. The switcher of claim 19, wherein the first or the second sliding coupling comprise at least a respective rotating element, mounted idle, the respective rotating element is in a solely resting relation alternatively on the surface of the of the respective conveyor element or on the main oscillating arm.

24. The switcher of claim 19, wherein the support structure comprises at least two longitudinal structural elements and two transversal structural elements joined to one another to form a rigid body, a transversal structural element supporting the inlet end of the first conveyor element, the other transversal structural element supporting the outlet end of the second conveyor element, each longitudinal structural element having at least a length which is equal to a longitudinal size of the first and the second conveyor element in the aligned condition, in a view from above.

25. The switcher of claim 24, wherein the longitudinal structural elements are located externally with respect to the conveyor elements.

26. The switcher of claim 19, wherein the first sliding coupling or the second sliding coupling are rigidly constrained to the main oscillating arm and slide on the surface of the first conveyor element or of the second conveyor element, a rotating element, being a wheel, of the first sliding coupling or of the second coupling, resting on the surface of the first conveyor element or of the second conveyor element.

27. The switcher of claim 19, further comprising at least a guide element provided with a shaped profile surface interposed between the surface of the first element and the main oscillating arm, the first sliding coupling at least partly sliding on the shaped profile in order to determine variations in acceleration of the first conveyor element during movement thereof from the aligned condition to the switching condition, which variations are more uniform with respect to variations in acceleration of the first conveyor element in the same movement in an absence of the guide element.

28. A switcher, comprising
a support structure;
a first conveyor element associated to the support structure and mobile in rotation at an inlet end thereof about a first tilting axis;
a second conveyor element associated to the support structure and mobile in rotation at an outlet end thereof about a second tilting axis; and
a movement device configured for moving the first and the second conveyor elements about the respective tilting axes thereof, the movement device configuring the first and the second conveyor element between a condition of substantial alignment in which a mobile end of the first conveyor element opposite the inlet end and a mobile element of the second conveyor element opposite the outlet end are in reciprocal proximity and substantially flanked and a switched condition in which the mobile ends are distanced from one another in order to enable a passage of one or more objects which are crossing between the mobile ends, the movement device comprising a main oscillating arm which is mobile about a rotation axis, wherein the movement device is slidably coupled both to the first and to the second conveyor element, a sliding coupling zone to the first conveyor element being arranged in an opposite position to a respective sliding coupling zone to the second conveyor element with respect to the rotation axis of the main oscillating arm, wherein the first or the second sliding coupling comprise at least a respective rotating element, mounted idle, the respective rotating element being in a solely resting relation alternatively on the surface of the respective conveyor element or on the main oscillating arm.

29. A switcher, comprising a support structure;

a first conveyor element associated to the support structure and mobile in rotation at an inlet end thereof about a first tilting axis;

a second conveyor element associated to the support structure and mobile in rotation at an outlet end thereof about a second tilting axis; and a movement device configured for moving the first and the second conveyor elements about the respective tilting axes thereof, the movement device configuring the first and the second conveyor element between a condition of substantial alignment in which a mobile end of the first conveyor element opposite the inlet end and a mobile element of the second conveyor element opposite the outlet end are in reciprocal proximity and substantially flanked and a switched condition in which the mobile ends are distanced from one another in order to enable a passage of one or more objects which are crossing between the mobile ends, the movement device comprising a main oscillating arm which is mobile about a rotation axis, wherein the movement device is slidably coupled both to the first and to the second conveyor element, a sliding coupling zone to the first conveyor element being arranged in an opposite position to a respective sliding coupling zone to the second conveyor element with respect to the rotation axis of the main oscillating arm; and at least a guide element provided with a shaped profile surface interposed between the surface of the first element and the main oscillating arm, the first sliding coupling at least partly sliding on the shaped profile in order to determine variations in acceleration of the first conveyor element during movement thereof from the aligned condition to the switching condition, which variations are more uniform with respect to variations in acceleration of the first conveyor element in the same movement in an absence of the guide element.

30. A switcher, comprising a support structure;

a first conveyor element associated to the support structure and mobile in rotation at an inlet end thereof about a first tilting axis;

a second conveyor element associated to the support structure and mobile in rotation at an outlet end thereof about a second tilting axis; and a movement device configured for moving the first and the second conveyor elements about the respective tilting axes thereof, the movement device configuring the first and the second conveyor element between a condition of substantial alignment in which a mobile end of the first conveyor element opposite the inlet end and a mobile element of the second conveyor element opposite the outlet end are in reciprocal proximity and substantially flanked and a switched condition in which the mobile ends are distanced from one another in order to enable a passage of one or more objects which are crossing between the mobile ends, the movement device comprising a main oscillating arm which is mobile about a rotation axis, wherein the movement device is slidably coupled both to the first and to the second conveyor element, a sliding coupling zone to the first conveyor element being arranged in an opposite position to a respective sliding coupling zone to the second conveyor element with respect to the rotation axis of the main oscillating arm, wherein the support structure comprises at least two longitudinal structural elements and two transversal structural elements joined to one another to form a rigid body, a transversal structural element supporting the inlet end of the first conveyor element, the other transversal structural element supporting the outlet end of the second conveyor element, each longitudinal structural element having at least a length which is equal to a longitudinal size of the first and the second conveyor element in the aligned condition, in a view from above, wherein the longitudinal structural elements are located externally with respect to the conveyor elements.

* * * * *